(12) United States Patent
Schleinkofer et al.

(10) Patent No.: US 8,702,354 B2
(45) Date of Patent: Apr. 22, 2014

(54) CUTTING INSERT FOR A CUTTING TOOL

(75) Inventors: Uwe Schleinkofer, Reutte (AT); Remus Venturini, Rosshaupten (DE)

(73) Assignee: Ceratizit Austria Gesellschaft m.b.H., Reutte/Tirol (AT)

( * ) Notice: Subject to any disclaimer, the term of this patent is extended or adjusted under 35 U.S.C. 154(b) by 87 days.

(21) Appl. No.: 13/499,799

(22) PCT Filed: Sep. 30, 2010

(86) PCT No.: PCT/AT2010/000358
§ 371 (c)(1),
(2), (4) Date: Apr. 2, 2012

(87) PCT Pub. No.: WO2011/038433
PCT Pub. Date: Apr. 7, 2011

(65) Prior Publication Data
US 2012/0198973 A1 Aug. 9, 2012

(30) Foreign Application Priority Data
Oct. 2, 2009 (AT) .............................. GM 612/2009

(51) Int. Cl.
*B23B 27/22* (2006.01)
*B23B 27/00* (2006.01)

(52) U.S. Cl.
USPC .......................................... 407/113; 407/114

(58) Field of Classification Search
USPC ................... 407/113, 114, 115, 116
See application file for complete search history.

(56) References Cited

U.S. PATENT DOCUMENTS

| 3,947,937 | A | * | 4/1976 | Hertel | 407/114 |
| 4,087,192 | A | * | 5/1978 | Hertel | 407/114 |
| 5,193,947 | A | * | 3/1993 | Bernadic et al. | 407/114 |
| 5,449,255 | A | * | 9/1995 | Katbi et al. | 407/114 |
| 8,251,618 | B2 | * | 8/2012 | Kobayashi | 407/115 |
| 2011/0070039 | A1 | | 3/2011 | Park et al. | |

FOREIGN PATENT DOCUMENTS

| DE | 2357180 A1 | 5/1975 |
| DE | 2544991 B1 | 3/1977 |
| JP | 2004106150 A | 4/2004 |
| KR | 20010011938 A | 2/2001 |
| WO | 2009001973 A1 | 12/2008 |
| WO | 2009005218 A1 | 1/2009 |

* cited by examiner

*Primary Examiner* — Will Fridie, Jr.
(74) *Attorney, Agent, or Firm* — Laurence A. Greenberg; Werner H. Stemer; Ralph E. Locher

(57) ABSTRACT

A cutting insert for a machining cutting tool. In a radial direction Q, which extends in a main plane H from the cutting corner to a center Z of the cutting insert, the following are formed in order: a falling cutting surface, a chip guiding stage base adjacent the cutting surface, a first chip guiding stage, which is adjacent to the chip guiding stage base and has a first surface rising from the chip guiding stage base and a first plateau adjacent thereto. A second chip guiding stage has a second surface rising from the first plateau and a second plateau adjacent thereto. A third chip guiding stage has a third surface rising from the second plateau and a third plateau adjacent thereto.

14 Claims, 4 Drawing Sheets

Section D-D

Section C-C ⟶ Q

Section D-D

Section G-G

Section E-E

CUTTING INSERT FOR A CUTTING TOOL

BACKGROUND OF THE INVENTION

Field of the Invention

The present invention relates to a cutting insert for a cutting tool for machining a workpiece.

Cutting inserts for cutting tools for machining a workpiece are used in particular for machining metallic workpieces by turning. It is known to configure such cutting inserts as indexable inserts or turning indexable inserts, which have a plurality of cutting corners and cutting edges which can be used for example one after another once initially used cutting corners and cutting edges have become worn. In this case, the cutting inserts can be configured such that both a top surface (or top side) and a bottom surface (or underside) of the cutting insert can be used for material machining. The known cutting inserts often have a geometry in which the top surface and the bottom surface are structured in the same way, and in particular are provided with cutting edges and chip geometries for deflecting and breaking machined-off chips of material.

In this case, the known cutting inserts often have a structure which influences the movement in one direction of machined-off chips of material irrespective of the cutting depth (or chip depth) and the feed. As a result of this structuring, the cutting inserts are optimized for a particular cutting depth and a particular feed (or a particular feed rate) and poorer chip formation occurs outside the optimized range of application. For example, a number of cutting inserts have very good chip control at small cutting depths, said chip control becoming increasingly poor as the cutting depth increases, and other cutting inserts have good chip control at a relatively deep cutting depth, said chip control becoming increasingly poor as the cutting depth decreases.

KR 10-0312957 shows a cutting insert in the form of an indexable insert having a top surface and a bottom surface parallel thereto, said surfaces being connected together via a peripheral side wall. The cutting insert has a cutting corner. A cutting edge is formed by an edge in the region of the cutting corner and an adjoining edge, said edges extending in each case between the top surface and the side wall. Formed in the top surface in the region of the cutting corner is a chip geometry structure, which has two chip geometries at different levels in the direction of an axis of symmetry from the cutting corner to a centre of the cutting insert.

BRIEF SUMMARY OF THE INVENTION

It is the object of the present invention to provide a cutting insert for a cutting tool, said cutting insert providing good chip control even at different feed rates, different cutting depths and different materials to be machined.

The object is achieved by a cutting insert for a cutting tool for machining a workpiece according to claim 1. The cutting insert has: a top surface, a bottom surface and a peripheral side wall between the top surface and the bottom surface. The main orientation of the top surface defines a main plane. At least one corner, which is rounded in the circumferential direction (of the side wall), is formed. The at least one rounded corner is designed as a cutting corner at least on the side of the top surface. An edge in the region of the cutting corner and at least one edge adjoining the cutting corner, said edges extending between the side wall and the top surface, form a cutting edge. At least three chip geometries are arranged in a radial direction which extends in the main plane from the cutting corner to a centre of the cutting insert. The following are formed in the following order in the radial direction: a declining rake face (which declines towards the inside of the cutting insert and the inclination of which defines in particular the chip angle); a chip geometry floor following the rake face; a first chip geometry having a first surface, which rises with respect to the chip geometry floor, and a first plateau adjoining said first surface; a second chip geometry having a second surface, which rises with respect to the first plateau, and a second plateau adjoining said second surface; and a third chip geometry having a third surface, which rises with respect to the second plateau, and a third plateau adjoining said third surface. Insofar as it is described that the first, second and third plateaus adjoin in each case the rising first, second and third surfaces, respectively, it should be noted that it is not necessary for them to adjoin directly (for example with a sharp edge), but that for example a transition via a curved surface or the like is also possible. Within this description, a plateau is understood to be not just a completely flat surface but a plateau can also have a curved or domed surface. The first and/or the second and/or the third plateau may be configured for example in a flat manner, in particular parallel to the main plane defined by the top surface, but may also have for example a domed structure. However, compared with the respectively associated rising surface, the respective plateau has a substantially constant level with regard to the direction perpendicular to the main plane, or only a slight inclination. Insofar as reference is made to a main plane, reference is made to a flat plane which extends in a direction defined by the basic direction of the top surface (without taking consideration of the structure thereof in detail). The designations "top" surface and "bottom" surface are used in the present context for the description of the cutting insert, wherein said surfaces are actually arranged at the "top" or at the "bottom" only in the case of a corresponding orientation of the cutting insert. Accordingly, the designations "top" and "bottom" should not be interpreted in a limiting manner. Since, in the case of the cutting insert, three successive chip geometries are provided at different levels in the region of the cutting corner, good chip control for different feed rates, cutting depths and materials is achieved. The different chip geometries are used depending on the feed rate, the cutting depth and the material. On account of the provision of the three different chip geometries, both relatively soft metallic materials and also relatively tough metallic materials, such as high-strength stainless steels, can be machined with good chip control. Chip control is understood to mean, in particular, defined chip guidance, defined chip formation and defined chip breakage.

According to one development, a bevel is provided on the cutting edge. This bevel is arranged in front of the rake face in particular with regard to a direction from the cutting edge to the centre of the cutting insert. The bevel can be provided preferably both in the region of the cutting corner and in the further course of the cutting edge. It may have a different inclination and/or a different width along the cutting edge.

According to one development, the first plateau is arranged, with regard to a direction perpendicular to the main plane, at least partly at a first level below the level (serving as reference level) of the cutting edge in the region of the cutting corner and the third plateau is arranged, with regard to the direction perpendicular to the main plane, at least partly at a third level above the level of the cutting edge in the region of the cutting corner. The second plateau is thus located at a level between the level of the first plateau and the level of the third plateau. The result of this arrangement of the plateaus is that there is good chip control both for lower feeds or softer materials to be machined and for higher feeds or tougher materials to be machined. The different chip geometries are used depending on the feed rate, cutting depth and material.

According to one development, the second plateau is arranged, with regard to the direction perpendicular to the main plane, at a level h0+h2 or h0−h2, wherein h0, in the direction perpendicular to the main plane, is the level of the cutting edge in the region of the cutting corner and h2 is calculated as 0≤h2≤0.25 times hg. In this case, hg is the difference between the level h0 of the cutting edge and the chip geometry floor in the region of the cutting edge in the direction perpendicular to the main plane. This configuration has the effect that good chip control is achieved, in particular when materials which exhibit high resistance to chip formation are machined.

Preferably, the abovementioned first plateau of the first chip geometry is arranged at least partly at a level h0−h1, wherein the following applies for h1: 0.25 times hg≤h1≤0.75 times hg. What was stated above applies for the measurement of hg.

Preferably, the abovementioned third plateau of the third chip geometry is arranged at least partly at a level h0+h3, wherein the following applies for h3: 0.2 times hg≤h3≤1 times hg. What was stated above applies for the measurement of hg.

The abovementioned preferred height levels for the individual chip geometries support the desired good chip control at different feed rates, cutting depths and materials to be machined.

According to one development, in the region of the cutting corner there is provided an increased rake angle W which decreases with increasing distance from the cutting corner in a direction along the cutting edge up to an elevation of the chip geometry floor. On account of this configuration, a depression is formed in the chip geometry floor in the region of the cutting corner, said depression serving as a chip former, in particular in the range of smaller cutting depths, and effecting good chip control. An "increased" rake angle is understood in this case to mean that the rake face falls more steeply in this region (than for example in surrounding regions). The sides of the rake angle are formed by the main plane and the rake face.

According to one development, the rake angle increases again in the direction along the cutting edge after the elevation of the chip geometry floor. The result of this configuration is that the chip geometry floor has a low level in the region of the cutting corner, a higher level in the region of the elevation of the chip geometry floor and a lower level again in the further course of the cutting edge. In this way, good chip control is provided even at relatively high cutting depths. Preferably, the rake angle has its highest value in the region of the cutting corner, its lowest value in the region of the elevation and a value in between in the region after the elevation.

According to one development, the elevation of the chip geometry floor has the smallest height difference from the (reference) level of the cutting edge in the region of the cutting corner with regard to the direction perpendicular to the main plane in a region in which the first chip geometry is at the shortest distance from the cutting edge. The chip geometry floor thus has its smallest depth in this region. In this way, on account of the interaction of the chip geometries with a changing rake angle, good chip control is achieved for deep cutting depths, too. The chips can flow away in a controlled manner and a directed chip flow direction is ensured.

According to one development, the greatest height difference with regard to the direction perpendicular to the main plane is found between the level of the cutting edge in the region of the cutting corner and the level of the chip geometry floor in the region of the cutting corner. On account of this configuration, the chip geometry floor is at its lowest level in the region of the cutting corner, as a result of which good chip control is achieved in the region of smaller cutting depths on account of the depression formed. In further preferred embodiments, other sections of the chip geometry floor which are arranged along the cutting edge can have substantially the same height difference from the level of the cutting edge in the region of the cutting corner as the chip geometry floor in the region of the cutting corner.

According to one configuration, the surfaces of the first plateau, of the second plateau and of the third plateau each extend substantially parallel to the main plane.

According to a preferred configuration, the cutting insert is an indexable insert which has at least a second cutting corner. It should be noted that—depending on the circumferential shape of the cutting insert designed as an indexable insert—a different number of cutting corners can be provided, for example two cutting corners on the top surface in the case of a rhombic indexable insert, three cutting corners on the top surface in the case of a triangular indexable insert, four cutting corners on the top surface in the case of a rectangular indexable insert, etc. Preferably, the cutting insert has a substantially polygonal basic shape in plan view. The cutting insert can then preferably have a structure which is symmetrical (with respect to one or more planes of symmetry), as a result of which the cutting corners have matching structures. Preferably, the cutting corners each have a symmetrical structure with respect to an angle bisector.

According to one development, the cutting insert is designed as an indexable insert in which the bottom surface, too, is designed for machining a workpiece. In this case, the number of cutting corners available for material machining (compared with a cutting insert in which only the top surface serves for material machining) is doubled. In particular, the bottom surface of the cutting insert can be designed in an identical manner to the top surface. Preferably, the third plateau is designed as a support surface for the cutting insert in the cutting tool when the bottom surface is used for machining. In this embodiment, the third plateau fulfils a double function, firstly as part of the third chip geometry during material machining with the top surface and secondly as a support surface during material machining with the bottom surface.

According to one development, the second chip geometry is narrower than the first chip geometry in a transverse direction perpendicular to the radial direction (which extends from the cutting corner to the centre of the cutting insert). On account of this configuration, good chip control is achieved with the second chip geometry, in particular during the machining of tougher workpieces.

According to one configuration, the cutting insert is designed for machining by means of turning.

The object is also achieved by the use of a cutting insert according to the invention for machining a workpiece by turning.

Further advantages and developments can be gathered from the following description of an exemplary embodiment with reference to the figures.

DESCRIPTION OF THE INVENTION

Figure 1:
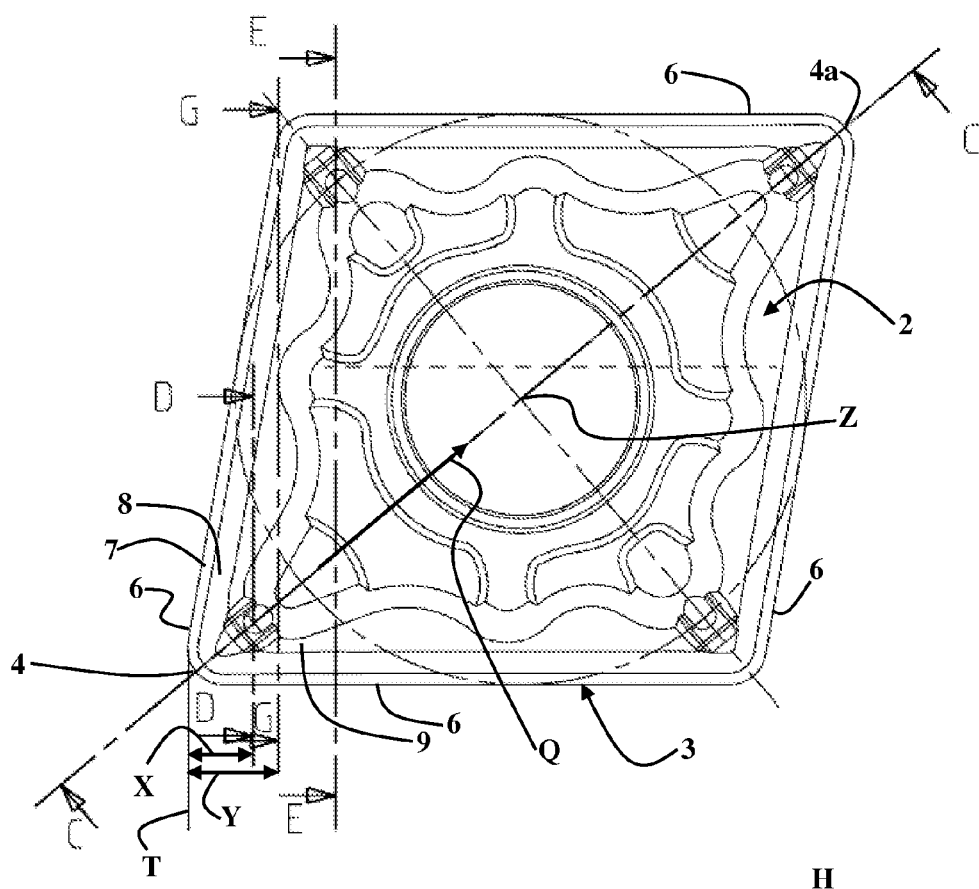
FIG. 1 shows a plan view of a cutting insert according to the exemplary embodiment.

An exemplary embodiment is described in the following text with reference to the figures. FIG. 1 shows a plan view of a cutting insert -1- according to the embodiment. The cutting insert -1- according to the exemplary embodiment is designed as an indexable insert. The cutting insert -1- has a top surface -2- (shown in FIG. 1) and a bottom surface arranged on the rear side (not shown) of the cutting insert -1-. It should be noted that the use of the designations "bottom" surface and "top" surface presumes a particular orientation of the cutting insert, which has been selected so that the following description can be understood better, and is not intended to represent a limitation. In this case, the "bottom" surface can of course also be arranged to the side of or above the "top" surface, depending on the orientation of the cutting insert.

In the exemplary embodiment, the bottom surface is designed in an identical manner to the top surface -2- and is arranged substantially (apart from the respective surface structurings) parallel thereto. The bottom surface and the top surface -2- are interconnected by a peripheral side wall -3- so that a body of the cutting insert -1- is bounded by the bottom surface, the top surface -2- and the side wall -3-. The top surface -2- extends (apart from the surface structurings, which will be described in more detail below) in a main plane H, which extends parallel to the plane of the drawing in FIG. 1. The direction perpendicular to the main plane H (and thus perpendicular to the plane of the drawing in FIG. 1) is denoted by the reference sign R in the following text. In plan view, the cutting insert -1- has a polygonal circumferential shape, which is formed in the exemplary embodiment illustrated by a rhombic shape having rounded corners. In a centre Z of the cutting insert -1-, a through-bore is formed between the top surface -2- and the bottom surface in order to fasten the cutting insert to a cutting tool. The cutting insert -1- according to the exemplary embodiment is designed as a cutting insert for machining material by turning in a turning tool. The cutting insert -1- is designed for the machining of metallic materials and is produced from hard metal.

The cutting insert -1- illustrated in FIG. 1 has, at opposite corners between the peripheral side wall -3- and the top surface -2-, identically configured cutting corners -4- and -4a-, of which only one cutting corner -4- (illustrated at the bottom left-hand side in FIG. 1) will be described in more detail. In the circumferential direction, the cutting corners -4- and -4a- each have a rounding having a radius r. An edge in the region of the cutting corners -4- and -4a-, said edge extending between the side wall -3- and the top surface -2-, is designed as a cutting edge for machining a workpiece. The edges -6- which adjoin the cutting corners -4- and -4a- on both sides and extend between the side wall -3- and the top surface -2- are likewise designed as cutting edges for machining the workpiece. The cutting edge is denoted overall in the following text by the reference sign -5-. In the exemplary embodiment illustrated, the cutting insert -1- is designed in a symmetrical manner with regard to a connecting line that runs between the cutting corner -4- and the cutting corner -4a- and through the centre Z. For this reason, only the structure of the top surface -2- on one side of the connecting line (the lower side in FIG. 1) is described in the following text. The connecting line also corresponds at the same time to a radial direction Q from the cutting corner -4- to the centre Z of the cutting insert -1-. The course of the cutting edge -5- may have a constant level (i.e. a constant height) in the direction R perpendicular to the main plane H from the respective cutting corner -4- or -4a- along the edge -6- or else have a changing level. In order to take these different possibilities into account, in the following text the level -h0- of the cutting edge -5- in the region of the cutting corner -4- (in particular at the point at which the radial direction Q intersects the cutting corner -4-) is used as reference level.

Figure 2:
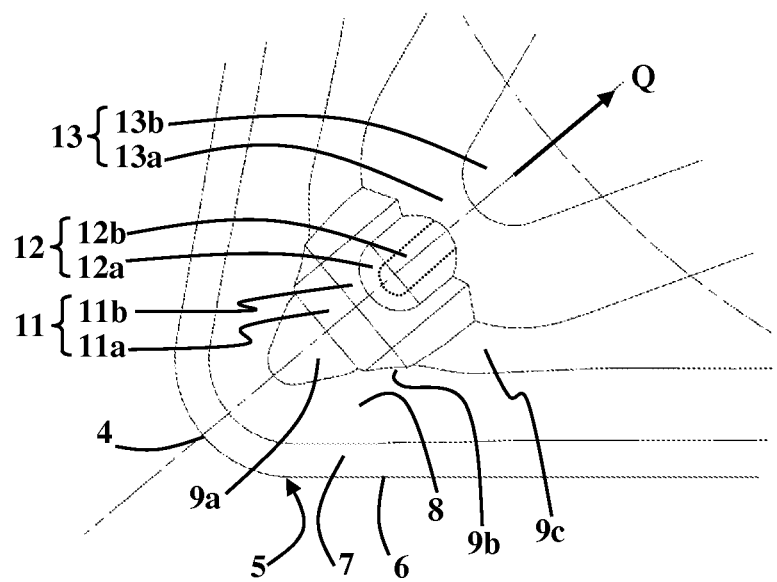
FIG. 2 shows an enlarged detail in the region of one cutting corner from FIG. 1.

The cutting edge -5- is provided with a bevel -7- in a known manner in its outer region both at the cutting corner -4- and in the further course of the edge -6-. In the direction of the centre Z, the bevel -7- is adjoined by a declining rake face -8-, the inclination angle of which determines the respective rake angle of the cutting insert -1- in the various regions. The cutting insert -1- according to the exemplary embodiment has, starting from the cutting corner -4-, different rake angles W along the edge -6-, as will be described in more detail in the following text. In the direction of the centre Z, the rake face -8- is adjoined by the chip geometry floor -9- (-9a-, -9b-, -9c-), which forms, in the direction to the centre Z, in each case the lowest level of chip-forming structures in the respective regions. As can be seen in FIG. 2, the chip geometry floor -9a- in the region of the cutting corner -4- and the chip geometry floor -9c- in a region of the edge -6-, which is located relatively far away from the cutting corner -4-, are each designed as planes. In a region in between, the chip geometry floor -9b-, by contrast, is designed in a linear manner.

In the exemplary embodiment, three chip geometries are formed in the region of the cutting corner -4-, a first chip geometry -11-, a second chip geometry -12- and a third chip geometry -13-. In FIG. 2, in order to clarify the individual structures of the second chip geometry -12-, the transition between a second rising surface -12a- and a second plateau -12b- is indicated by a dotted line.

Figure 4:
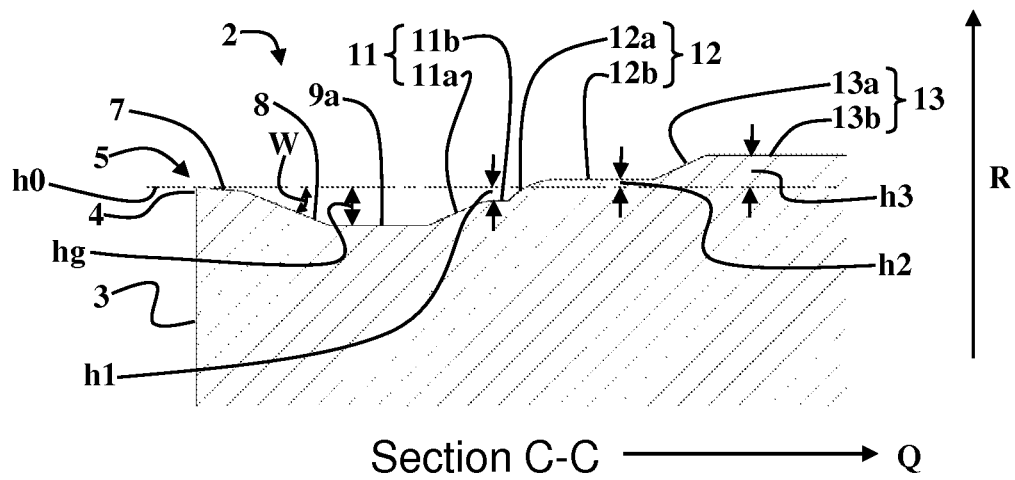
FIG. 4 shows a detail from a section along the line C-C in FIG. 1 in the region of the cutting corner.

The course of the three chip geometries starting from the cutting corner -4- in a direction towards the centre Z is described with reference to FIG. 2 and FIG. 4. In the region of the cutting corner -4-, the chip geometry floor -9a- is located at a level which is at a height -hg- below the level -h0- of the cutting edge -5- in the region of the cutting corner -4-. In the direction to the centre Z, the chip geometry floor -9a- is adjoined by the first chip geometry -11-, which has a first rising surface -11a- and a first plateau -11b- adjoining said first surface -11a-. As can be seen in FIG. 4, the first plateau -11b- is at a level which is located a height -h1- below the level -h0- of the cutting edge -5- in the region of the cutting corner -4-. The height -h1- is in this case in a range: 0.25 times hg≤h1≤0.75 times hg. Starting from the level of the first plateau -11b-, the latter is adjoined by the second chip geometry -12-, which has a second rising surface -12a- and a second plateau -12b- adjoining said second surface -12a-. The second plateau -12b- is located at a level which is approximately at the same height as the level -h0-, in particular at a height -h2- above or below the level -h0-. In this case, -h2- has a value in the range: 0 times hg≤h2≤0.25 times hg. Starting from the level of the second plateau -12b-, the latter is adjoined by the third chip geometry -13-, which has a third rising surface -13a- and a third plateau -13b- adjoining said third surface -13a-. The third plateau -13b- is located at a level at a height -h3- above the level -h0-. The height -h3- has a value in the range: 0.2 times hg≤h3≤1 times hg. In the ranges of values described for -h1-, -h2- and -h3-, it should be noted that the first plateau -11b- must always be lower than the second plateau -12b- and the second plateau -12b- lower than the third plateau -13b-. The height -hg- may be for example 0.18 mm. In the exemplary embodiment illustrated, the third plateau -13b- is designed such that it forms a support surface for the cutting insert -1- in a cutting tool when the bottom surface of the cutting insert -1- is used to machine a workpiece.

Figure 5:
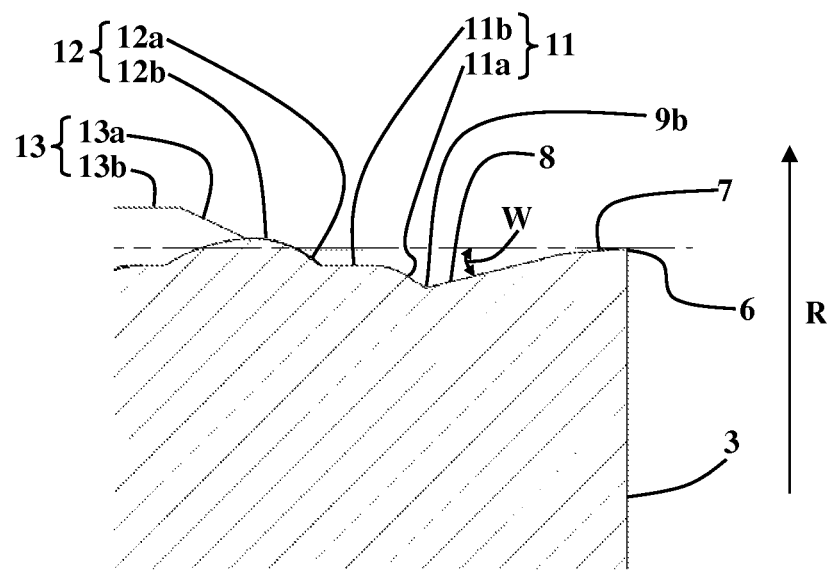
FIG. 5 shows a detail from a section along the line D-D in FIG. 1 in the region of the cutting edge.

A course of the individual structures in a section in the direction D-D in FIG. 1 is described in the following text with reference to FIG. 5. The section extends in a plane perpendicular to the edge -6- in a region in which the first plateau -11b- of the first chip geometry -11- is at the shortest distance from the cutting edge -5-.

Starting from the edge -6-, first of all the bevel -7- is provided in a region adjoining the edge -6-, it being possible for the bevel -7- to have a different inclination and/or width than in the region of the cutting corner -4-. The bevel -7- is adjoined by the rake face -8-, which forms a much flatter rake angle W than in the above-described region of the cutting corner -4-. The adjoining chip geometry floor -9b- is formed only in a linear manner in this region and is located at a much higher level than the chip geometry floor -9a- in the region of the cutting corner -4-. As will become clearer from the following description, this region of the chip geometry floor -9b- forms the maximum height of an elevation of the chip geometry floor -9-. The first chip geometry -11- adjoins with the first rising surface -11a- and the first plateau -11b-. Subsequently, the second chip geometry -12- with the second rising surface -12a- and the second plateau -12b- arises from the first plateau -11b-.

Figure 6:
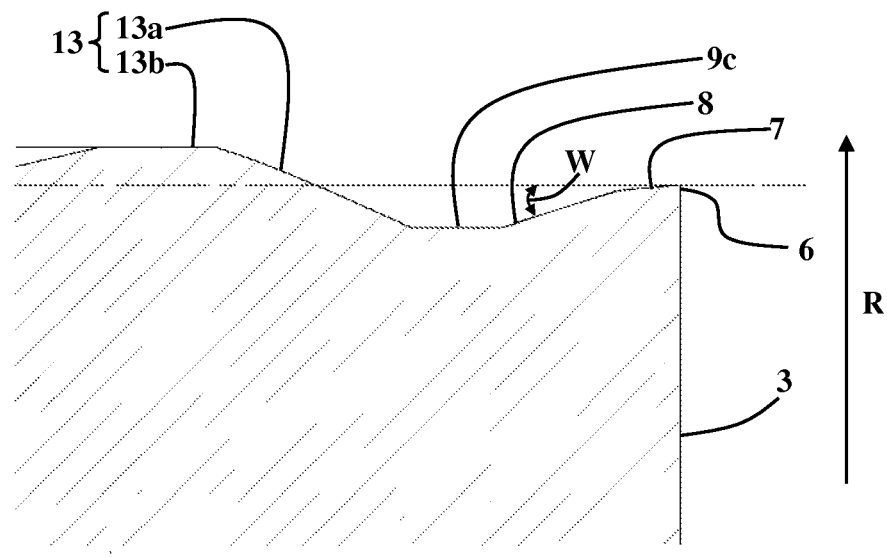
FIG. 6 shows a detail from a section along the line G-G in FIG. 1 in the region of the cutting edge.

A course of the individual structures in a section in the direction G-G in FIG. 1 is described in the following text with reference to FIG. 6. This section extends in a plane perpendicular to the edge -6- in a region in which the first chip geometry -11- and the second chip geometry -12- are no longer sectioned. It is located in the direction along the edge -6- precisely in that region in which the first chip geometry -11- ends (and the first rising surface -11a- of the first chip geometry -11- intersects the third rising surface -13a- of the third chip geometry -13-). Starting from the edge -6-, first of all the bevel -7- is once again formed, it being possible for the bevel -7- to have a different inclination and/or width than in the above-described regions. Formed adjoining the bevel -7- is the rake face -8-, which in this region has a rake angle W which is again larger than in the region described above (with reference to FIG. 5), in which the elevation of the chip geometry floor is formed. The chip geometry floor -9c- adjoining the rake face -8- is again located at a much lower level than the chip geometry floor -9b- in the region in which the elevation of the chip geometry floor -9b- is formed. For example, the chip geometry floor -9c- can be located again approximately at the level of the chip geometry floor -9a- in the region of the cutting corner -4- or at a slightly higher level.

Figure 7:
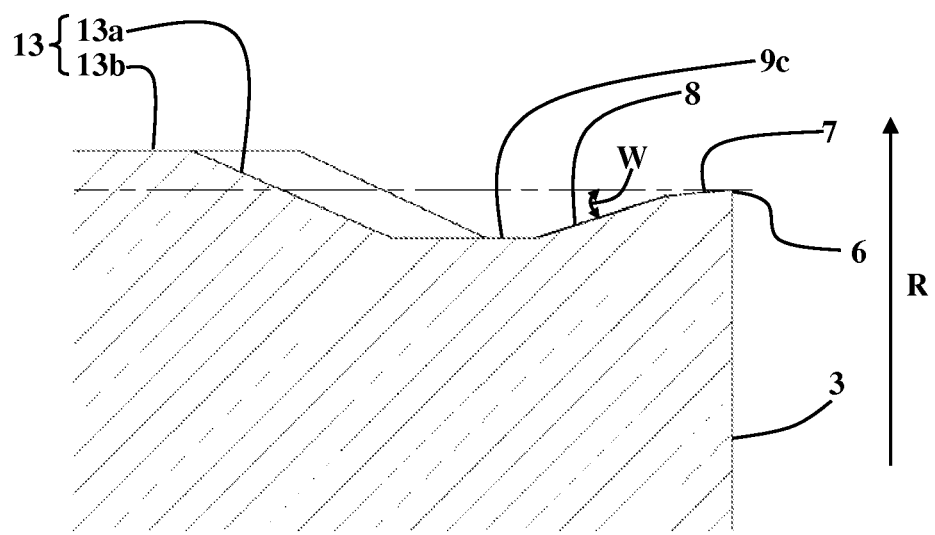
FIG. 7 shows a detail from a section along the line E-E in FIG. 1 in the region of the cutting edge.

A course of the individual structures in a section in the direction E-E in FIG. 1 is also briefly described in the following text with reference to FIG. 7. This is a section in a region of the edge -6- which is even further away from the cutting corner -4- than the region described above with reference to FIG. 6. As can be seen in FIG. 7, the chip geometry floor -9c- is much wider in this region. The chip geometry floor -9c- can be located in this region again at approximately the same level as the chip geometry floor -9a- in the region of the cutting corner -4-. The rake angle W defined by the rake face -8- can be for example in the same order of magnitude as in the above-described region of the section G-G.

Thus, a cutting insert -1- for a cutting tool for machining a workpiece has been described, wherein in the region of a cutting corner -4- there are provided three chip geometries (first chip geometry -11-, second chip geometry -12-, third chip geometry -13-), which each have rising surfaces and plateaus. The plateaus (-11b-, -12b-, -13b-) are in this case arranged at different height levels with regard to a direction R perpendicular to the main plane H. In particular, the first plateau -11b- is located at a level below the reference level -h0- of the cutting edge -5- in the region of the cutting corner -4-, the second plateau -12b- is located approximately at the reference level -h0- and the third plateau -13b- is located at a much higher level. The different height levels of the plateaus provide in each case good chip control at different feed rates, cutting depths and materials. Provided in the region of the cutting corner -4- is also an increased rake angle W, which first decreases with increasing distance from the cutting corner -4-, so that a depression in the chip geometry floor -9- is formed in the region of the cutting corner -4-. This depression in the chip geometry floor -9- in the region of the cutting corner -4- forms, in conjunction with the first chip geometry -11-, a hollow which acts as a chip former in the range of small cutting depths and effects good chip control.

On account of the geometric configuration described, an elevation of the chip geometry floor -9- is produced in the direction along the cutting edge -5- away from the cutting corner -4-. Given a symmetrical configuration of the cutting corner -4- with regard to the connecting line to the centre Z, as in the exemplary embodiment described, these features are formed on both sides of the cutting corner -4-. The elevation of the chip geometry floor -9- (in the region of the chip geometry floor -9b-) supports the chip guidance at deeper cutting depths. The elevation of the chip geometry floor has its highest level in the region in which the first plateau -11b- of the first chip geometry -11- is at its shortest distance from the cutting edge -5-. With increasing distance from the cutting corner -4-, the rake angle W rises again and the distance between the cutting edge -5- and the first plateau -11b- increases again. Thus, in this region, a lowering of the chip geometry floor -9- is achieved again. This structure leads to good chip control. The height level of the first plateau -11b- is below the reference level -h0-. The second chip geometry -12- is positioned on the first chip geometry -11-, it being arranged in an offset manner in the radial direction Q in the direction of the centre Z with respect to the first chip geometry -11-. The second chip geometry -12- is at a level which corresponds approximately to the reference level -h0- and is less wide than the first chip geometry -11- in the transverse direction perpendicularly to the radial direction Q. In the case of materials which have greater resistance to chip formation, the chip strikes the second plateau -12b- and is formed there. The third chip geometry -13- adjoins the second chip geometry -12-. The ridge formed by the third chip geometry -13- ensures good chip control for deep cutting depths. In conjunction with the elevation of the chip geometry floor -9- at the narrowest point between the first plateau -11b- and the cutting edge -5-, it is ensured that even at deep cutting depths, the chips can flow away in a controlled manner and there is a directed chip flow direction.

Good chip control in different application areas arises with the interaction of the structures described.

The rake angle W in the region of the cutting corner -4- is preferably in a range between 15° and 25°. The rake angle W is defined in particular by the angle between the rake face -8- and the main plane H. The described reduction in the rake angle W from the region of the cutting corner -4- to the region shown in section D-D, in which the first plateau -11b- is at its shortest distance from the cutting edge -5-, is preferably in the range between 5% and 30%. The cutting corner -4- has a corner radius R which is for example in a range between 0.2 mm and 2.4 mm. It may be for example 0.2 mm, 0.4 mm, 0.8 mm, 1.2 mm, 1.6 mm or 2.4 mm.

FIG. 1 illustrates a tangent T, which extends in the main plane H in a direction perpendicular to the direction of the edge -6- (illustrated at the bottom in FIG. 1) and touches that point of the cutting corner -4- which is outermost with regard to the direction of the edge -6-. The distance of the region of the elevation of the chip geometry floor -9-, in which the first plateau -11b- is at its shortest distance from the cutting edge -5-, from the tangent T is defined as X. The value of this distance X is preferably in the range: 1 times r≤X≤4 times r.

The distance between the (above-described) tangent T and the section plane G-G is defined as Y in FIG. 1. The section plane G-G passes in this case through a point in which the lower end of the rising surface -11a- of the first chip geometry -11- and the lower end of the rising surface -13a- of the third chip geometry -13- intersect. Y preferably has a value in the following range: 1.5 times r≤Y≤6 times r. However, the following must apply: X<Y.

The angle of the cutting corner -4- (angle between the respectively adjoining edges -6-) is preferably in the range between 30° and 90°.

In the exemplary embodiment, the bevel -7- in the region of the cutting corner -4- has a different width (in the direction perpendicular to the cutting edge -5-) than in the region of the further course of the edges -6-. The bevel -7- serves to stabilize the course of the cutting edge -5-. In the exemplary embodiment, the bevel -7- is narrow in the region of the cutting corner -4- and its width increases from the region of the elevation of the chip geometry floor -9- (position of the section plane D-D in FIG. 1). The result of this configuration is that the cutting insert is easy-cutting for the region of shallow cutting depths and the cutting edge is protected against fragments breaking off for the region of deep chip depths. The width of the bevel -7- is preferably in a range between 0.1 mm and 0.35 mm. The difference in width between the region of the cutting corner -4- and the further away region of the edge -6- is preferably between 10% and 30%.

Figure 3:
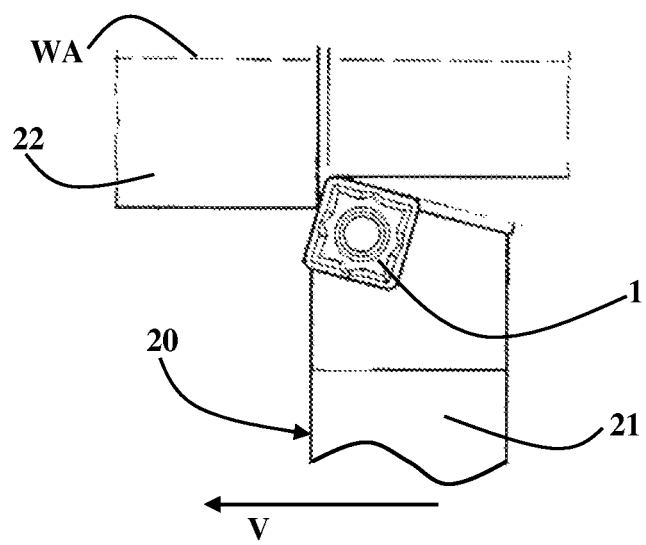
FIG. 3 shows by way of example the use of a rectangular cutting insert in a cutting tool.

FIG. 3 shows by way of example one use of a cutting insert -1- in a cutting tool -20- for machining a workpiece. FIG. 3 illustrates for example a cutting insert -1- having a rectangular cross-sectional shape, but cutting inserts having a cross-section shape as illustrated in FIG. 1 and FIG. 2 are used in a comparable manner. The cutting insert -1- is fastened in a tool holder -21- and is used to machine a workpiece -22- by turning. In this case, the workpiece -22- to be machined turns about an axis WA and in the process is machined by the cutting insert -1-, which is moved in a feed direction V.

The invention claimed is:

1. A cutting insert for a cutting tool for machining a workpiece, the cutting insert comprising:
a cutting insert body formed with a upper surface having a main orientation defining a main plane, a lower surface, and a peripheral side wall extending between said upper surface and said lower surface;
at least one corner of said cutting insert body being rounded in a circumferential direction and forming a cutting corner at least on a side of said upper surface;
a cutting edge formed by an edge in a region of said cutting corner and at least one edge adjoining said cutting corner, said edges extending in each case between said side wall and said upper surface;
said cutting insert being formed, along a radial direction extending in the main plane, in order starting from said cutting corner towards a center of the cutting insert, with:
a declining rake face;
a chip geometry floor adjoining said rake face;
a first chip geometry adjoining said chip geometry floor, said first chip geometry having a first surface rising with respect to said chip geometry floor and a first plateau adjoining said first surface;
a second chip geometry having a second surface rising with respect to said first plateau and a second plateau adjoining said second surface;
a third chip geometry having a third surface rising with respect to said second plateau and a third plateau adjoining said third surface; and
said second chip geometry being narrower than said first chip geometry in a transverse direction that extends perpendicularly to the radial direction and parallel to the main plane.

2. The cutting insert according to claim 1, wherein a bevel is formed on said cutting edge.

3. The cutting insert according to claim 1, wherein said first plateau is arranged, with regard to a direction perpendicular to the main plane, at least partly at a first level below a level of said cutting edge at said cutting corner and said third plateau is arranged, with regard to the direction perpendicular to the main plane, at least partly at a third level above the level of said cutting edge at said cutting corner.

4. The cutting insert according to claim 1, wherein said second plateau is arranged, relative to a direction perpendicular to the main plane, at least partly at a level h0+h2 or h0−h2; and
wherein:

$$0 \leq h2 \leq 0.25 \times hg;$$

h0 is the level of said cutting edge in the perpendicular direction in the region of the cutting corner; and
hg is a difference between the level h0 of said cutting edge and said chip geometry floor in the perpendicular direction in the region of said cutting corner.

5. The cutting insert according to claim 1, wherein a rake angle is provided in a region of said cutting corner which decreases with increasing distance from said cutting corner in a direction along said cutting edge up to an elevation of said chip geometry floor, and wherein said rake angle is formed between the main plane and said rake face.

6. The cutting insert according to claim 5, wherein said rake angle increases again in the direction along said cutting edge after the elevation of said chip geometry floor.

7. The cutting insert according to claim 5, wherein, in a region in which said first chip geometry has a shortest distance to said cutting edge, the elevation of said chip geometry floor has a smallest height difference to h0, h0 being the level of said cutting edge at said cutting corner.

8. The cutting insert according to claim 1, wherein a greatest height difference with regard to the direction perpendicular to the main plane is found between the level of said cutting edge at said cutting corner and the level of said chip geometry floor in a region of said cutting corner.

9. The cutting insert according to claim 1, wherein each of said first plateau, said second plateau, and said third plateau extends substantially parallel to the main plane.

10. The cutting insert according to claim 1, formed as an indexable insert formed with said cutting corner and at least a further cutting corner.

11. The cutting insert according to claim 1, formed as an indexable insert wherein said lower surface is also formed for machining a workpiece.

12. The cutting insert according to claim 11, wherein said third plateau is configured for use as a support surface for supporting the cutting insert in a cutting tool when said lower surface is used for machining.

13. A turning machine, comprising the cutting insert according to claim 1 disposed for machining a workpiece by turning.

14. A cutting tool, comprising the cutting insert according to claim 1.

* * * * *